Figure 1:
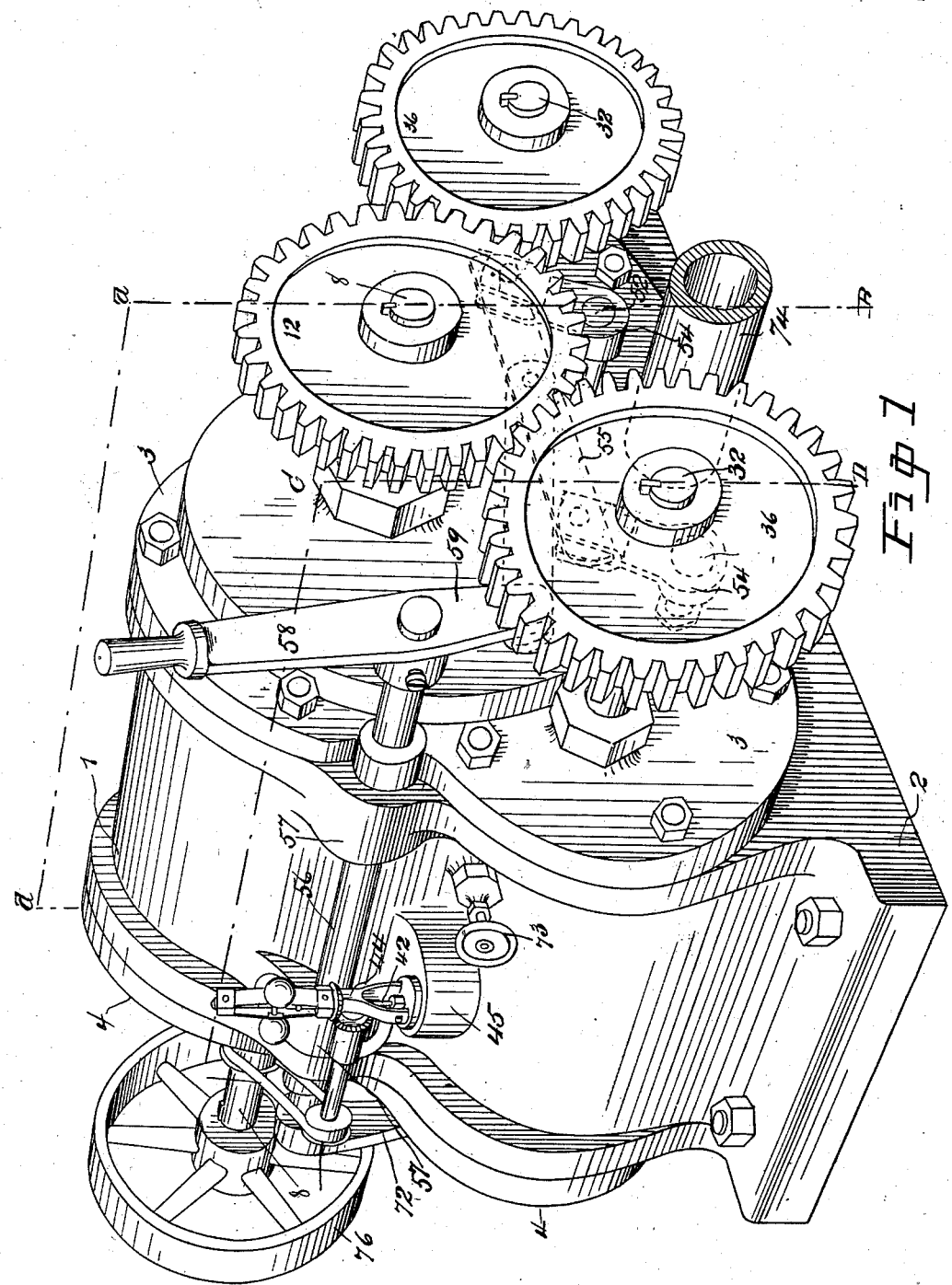

No. 702,474. Patented June 17, 1902.
J. A. PORTER.
ROTARY ENGINE.
(Application filed Sept. 12, 1901.)
(No Model.) 6 Sheets—Sheet 1.

WITNESSES:
W. L. Bushong
Wm. O. Morck

INVENTOR
James A. Porter
BY Thompson & Bell
ATTORNEY.

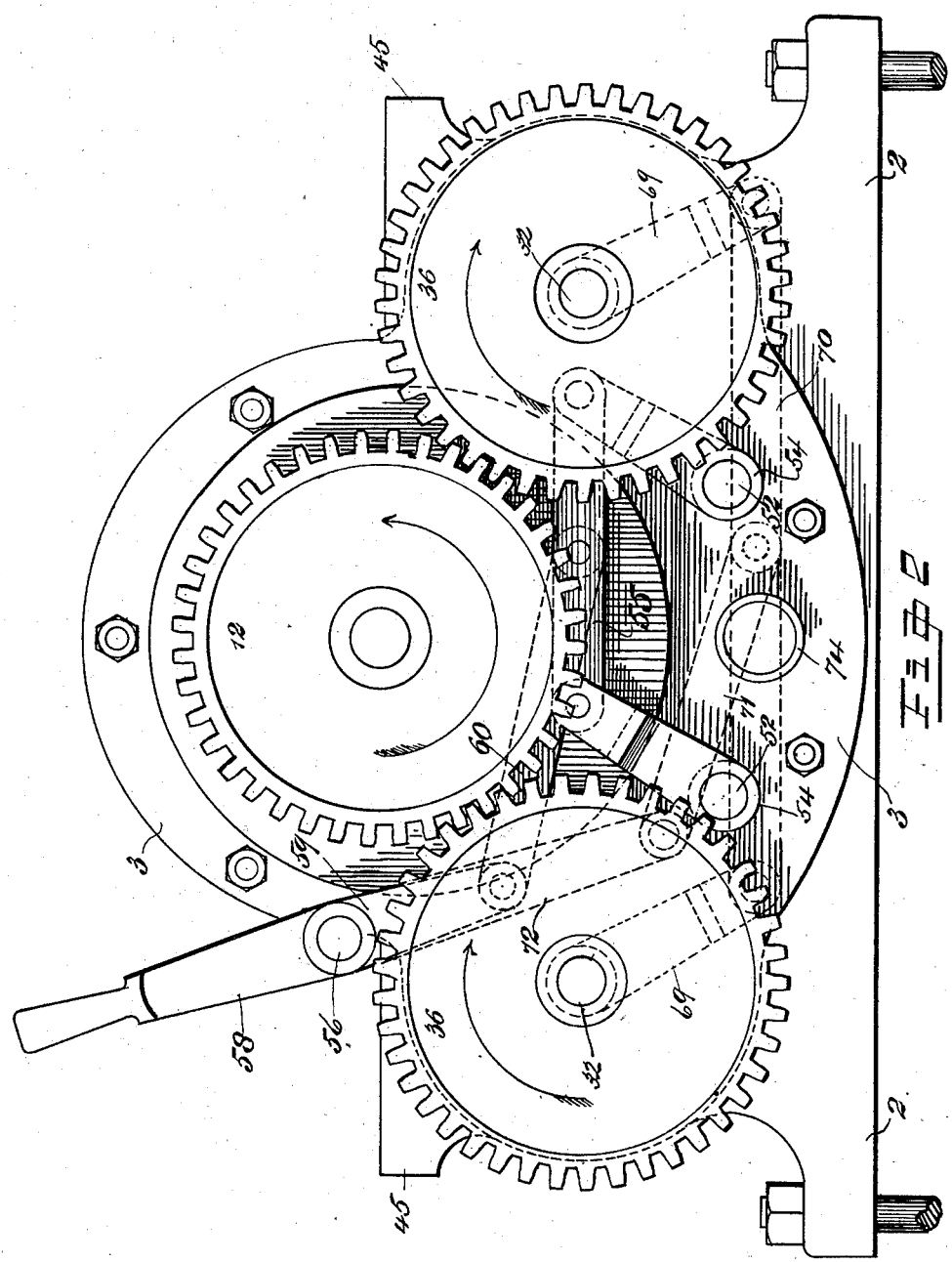

No. 702,474.  
J. A. PORTER.  
ROTARY ENGINE.  
(Application filed Sept. 12, 1901.)  
Patented June 17, 1902.
(No Model.)  
6 Sheets—Sheet 3.
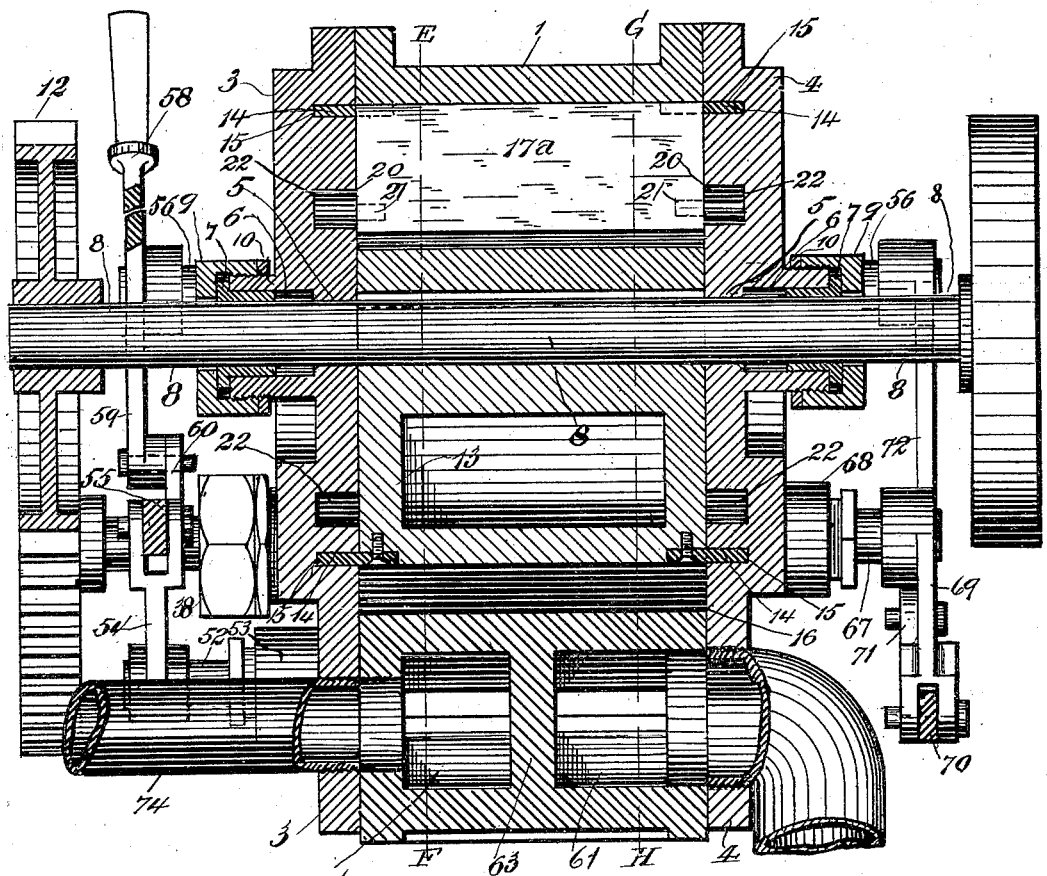
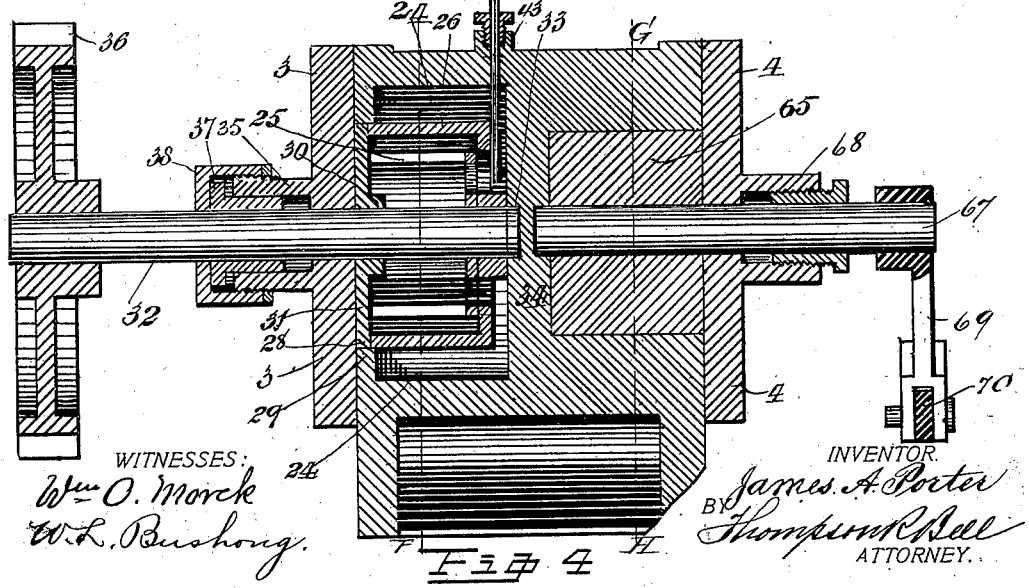
WITNESSES:  
Wm. O. Morck  
W. L. Bushong.
INVENTOR.  
James A. Porter  
BY Thompson K. Bell  
ATTORNEY.

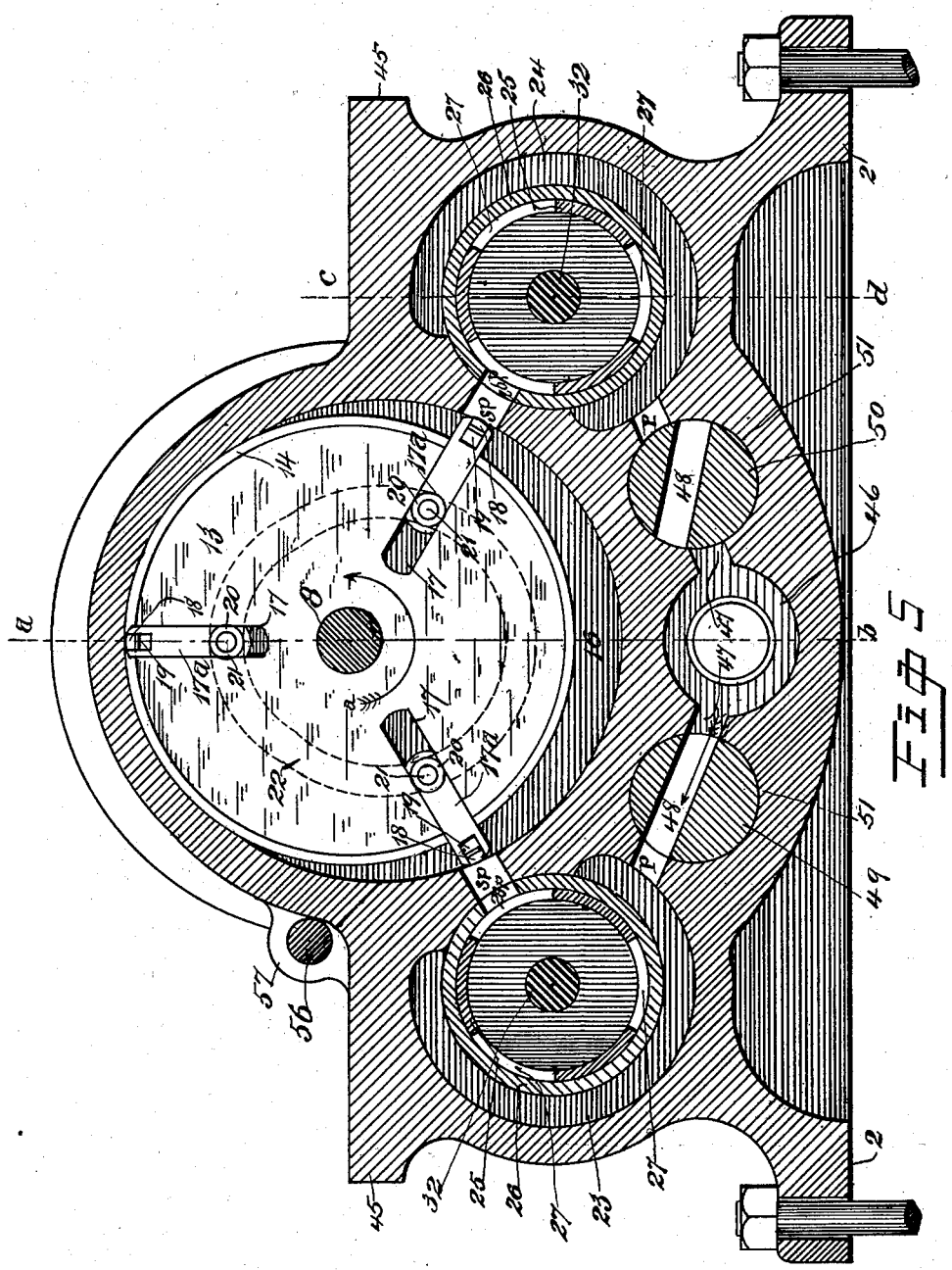

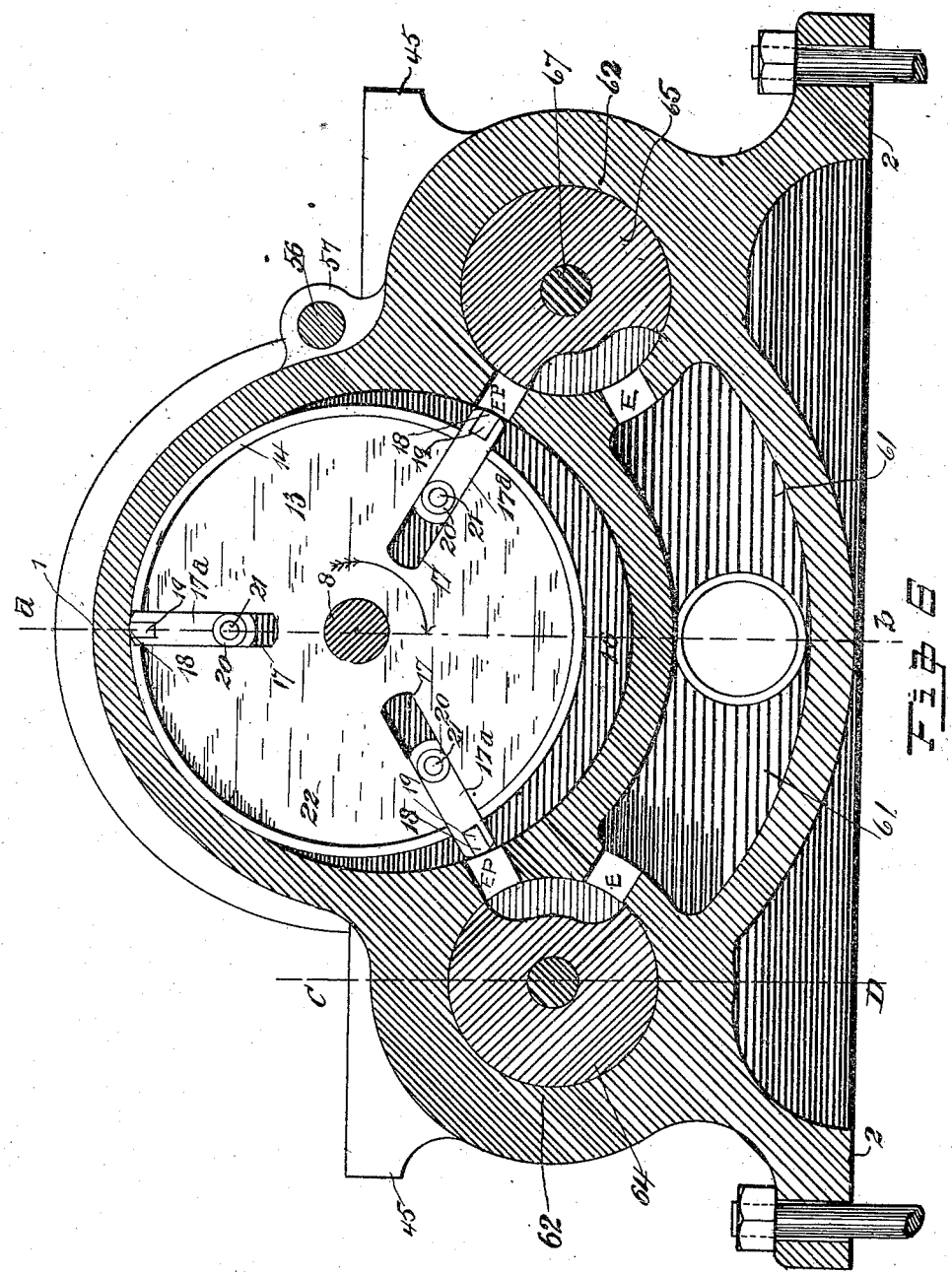

No. 702,474. Patented June 17, 1902.
J. A. PORTER.
ROTARY ENGINE.
(Application filed Sept. 12, 1901.)
(No Model.) 6 Sheets—Sheet 6.
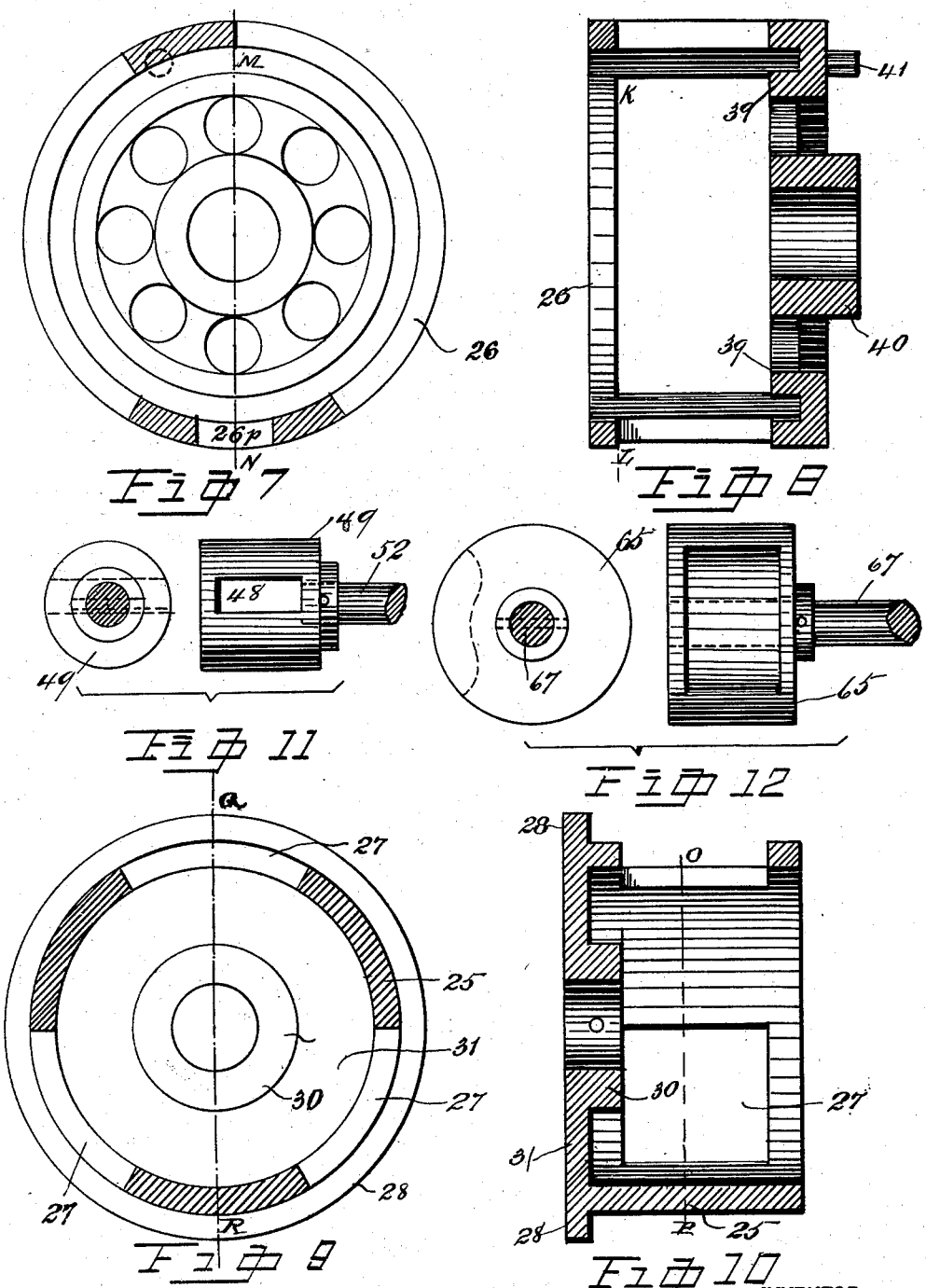
WITNESSES:
INVENTOR.
ATTORNEY.

UNITED STATES PATENT OFFICE.

JAMES A. PORTER, OF CRAWFORDSVILLE, INDIANA, ASSIGNOR OF TWO-THIRDS TO JOSEPH L. BEESLEY AND EDGAR STONE, OF CRAWFORDSVILLE, INDIANA.

ROTARY ENGINE.

SPECIFICATION forming part of Letters Patent No. 702,474, dated June 17, 1902.

Application filed September 12, 1901. Serial No. 75,177. (No model.)

*To all whom it may concern:*

Be it known that I, JAMES A. PORTER, a citizen of the United States, residing at Crawfordsville, in the county of Montgomery and State of Indiana, have invented new and useful Improvements in Rotary Engines, of which the following is a specification.

My invention relates to certain new and useful improvements in rotary engines employing as a propelling means expansive or elastic fluid-pressure, and in this specification and claims whenever I use the term "steam" I wish it understood that such term includes any expansive fluid, although my invention of a rotary engine is more especially designed to use steam as a propelling fluid.

My improvements are clearly illustrated in the accompanying drawings and hereinafter fully described and specifically claimed. I attain these objects by means of the mechanism illustrated in the accompanying drawings, in which similar characters of reference designate like parts throughout the several views.

Figure 1 is a perspective view of my invention of a rotary engine. Fig. 2 is a side elevational view of the same, showing the gearing for positively and continuously rotating the steam-distributing valves. Fig. 3 is a longitudinal sectional view of the engine, taken through the line A B. (See Figs. 1, 5, and 6.) Fig. 4 is a similar sectional view taken through the line C D. (See Figs. 1, 5, and 6.) Fig. 5 is a transverse sectional elevational view of the engine, taken through the line E F. (See Figs. 3 and 4.) Fig. 6 is a similar sectional view taken through the line G H. (See Figs. 3 and 4.) Fig. 7 is an enlarged detail sectional end view of the cut-off or expansion valve and taken through the line K L. (See Fig. 8.) Fig. 8 is an enlarged detail sectional longitudinal view of said valve, taken through the line M N. (See Fig. 7.) Fig. 9 is an enlarged detail sectional end view of the rotatable steam-distributing valve and taken through the line O P. (See Fig. 10.) Fig. 10 is an enlarged detail sectional longitudinal view of the same and taken through the line Q R. (See Fig. 9.) Fig. 11 is detail end and side views of the steam-reversing valves, and Fig. 12 is detail end and side views of the exhaust-valves.

The steam-cylinder 1 is divided into a top piston receiving or bearing portion or bore and a lower steam-receiving space or chamber of larger bore than said top portion, and said chamber or lower bore has its axis situated beneath or eccentric with and parallel to the axis of the top or piston-receiving bore, and said cylinder 1 is provided with a supporting-base 2, formed integral therewith. The cylinder covers or heads 3 and 4 are securely bolted to the ends of said main steam-cylinder, and the main journal-bearings 5 are formed integral and in position thereon that their common axes coincide with the axis of the top or piston-receiving bore of the said cylinder 1, and consequently are situated eccentrically with the larger bore or lower steam-receiving space of said cylinder. The journal-bearings 5 project outwardly from the faces of the covers 3 and 4 and are bored to form packing spaces or boxes 6, which are adapted to receive the packing-glands 7. The glands 7 are moved longitudinally into the packing-boxes 6 to compress the packing therein and around the main or driving shaft 8 by the cap-nuts 9, and the latter are locked in position on said journal-boxes by the locking-nuts 10. The main or driving shaft 8 is journaled in the main journal-bearings 5, and the ends of said shaft are prolonged to project beyond the main journal-bearings an extent sufficient to support the driving gear-wheel 12 in such position thereon that said gear-wheel will not contact with the other mechanism situated on the same side of the engine.

The rotary piston-center 13 is keyed or otherwise secured on the shaft 8, and packing-rings 14 are shrunk or otherwise secured on the reduced ends of said piston-center 13 to be flush with the periphery of the latter and to project over and beyond the ends thereof an extent sufficient to completely fill the packing-recesses 15, formed in the cylinder-heads 3 and 4, to form a steam-tight joint and to prevent the escape of steam from the steam space or chamber 16 between the piston 13 and the shell of the cylinder 1 and between the ends of said piston-center and the cylinder-heads 3 and 4 to and through the journal-bearings 5. The guideways 17 of the piston-wings 17ª are formed in the piston-center 13 to extend radially from the center or axis thereof, and the said guideways are of a length sufficient to permit the said wings 17ª to move inwardly and outwardly the full extent of their travel throughout their paths of rotation. The wing-guideways 17 are spaced at equal distances apart or are divided equally around the periphery of said piston-center 13, and said guideways 17 are finished to accurately receive the piston-wings 17ª and to form steam-tight joints between said piston-wings and guideways. The wings 17ª are grooved longitudinally along their longitudinal bearing or outer edges to receive their packing-strips 18, which accurately fit therein, and said strips are held in contact with the inner surface of the cylinder 1 by their packing-springs 19. The guide-rollers 20, preferably of steel, freely turn on their studs 21, secured in the ends of said piston-wings 17ª, and said rollers 20 are adapted to work or roll in the camways or guides 22, formed in the inner sides of the cylinder-heads 3 and 4, (see Fig. 3, which shows said camways in cross-section, and Figs. 5 and 6, which show same in dotted lines,) and both of said ways 22 are directly opposed to each other and are similar in form, and said ways are provided for the purpose of not only guiding the piston-wings 17ª as they are carried around with revolving rotary piston 13, but also for the purpose of taking up the stress, due to their centrifugal forces, of the piston-wings 17ª and preventing undue pressure between said piston-wings and the interior surface of the cylinder 1, and thereby reduce the friction to a minimum.

The steam-chests 23 and 24, wherein the steam-distributing and the expansion valves are inclosed and work, are situated at one end of the front and rear sides of the steam-cylinder 1, equally distant from and below the center or axis of the rotary piston 13, and said steam-chests are preferably formed integral with the cylinder 1. The steam-distributing valve 25 is of the cylindrical cage type and is provided with the peripheral and longitudinally-extending ports or steam-outlets 27, which are equal in width and area and of a number corresponding with the number of wings 17ª employed in connection with the rotary piston 13, which in this instance is three. The distributing-valves 25 are truly turned on their exterior surfaces to accurately fit and freely turn in the bores of the cut-off or expansion valves 26, and said distributing-valves are provided with the bearing-flanges 28, which are truly turned to accurately fit and turn in the bearings 29, formed integral on the interior outer ends of said steam-chests 23 and 24, and said valves 25 are provided with the hubs 30, which are formed centrally and integral on their closed ends 31.

The hubs 30 are drilled to receive the valve-spindles 32, on which latter they are securely keyed or otherwise secured. The valve-spindles 32 are prolonged to extend through and to project slightly beyond the inner ends of the valves 26 to be supported at their inner ends in the bearings 33, formed in the separating-walls 34, and the said spindles 32 are prolonged to extend outwardly through their packing-boxes 35, beyond which they project an extent to provide the necessary clearance-space required between said packing-boxes 35 and the gear-wheels 36, which latter are keyed or otherwise secured thereon to turn therewith.

Suitable packing-glands 37 and gland-caps 38, similar to the packing-glands 7 and the gland-caps 9, are provided and for the same purpose.

The cylindrical cut-off or expansion valves 26, as previously explained, have their interior surfaces turned truly to receive the distributing-valves 25, which latter revolve continuously therein. Interior inwardly-extending bearing-flanges 39 are formed integral on the ends of the said expansion-valves 26, and the said flanges are turned truly to accurately and freely fit the interior trued end surfaces of the distributing-valves 25 to form additional end bearings therefor.

The expansion or cut-off valves 26 have the greater portion of the metal at their peripheries cut away or are preferably made open or cage form, as illustrated particularly in Figs. 7 and 8. The hubs 40 of the said valves 26 are drilled to loosely fit on the inner end portions of the valve-spindles 32, so that said valves 26 are free to be operated or moved independently of the distributing-valves 25. The hubs 40 of the expansion-valves 26 bear against the dividing-walls 34 and the closed ends 31 of the distributing-valves 25 bear against the interior surfaces of the covers 3 and 4, and the said pairs of valves 25 and 26 are thereby held in position in a longitudinal direction relatively to each other and excessive end play is prevented. The wrist-pins 41 are secured in the ends of said expansion-valves 26 at a distance from their centers or axes to obtain the necessary leverage and motion, and said wrist-pins are situated relatively to the port-openings 26ᵖ of said valves 26 to be underneath the stuffing-boxes 43 when the said valves are in normal position—that is, when the ports 26ᵖ register with the steam ports *sp* of the main cylinder 1. Suitable connecting-rods 42 extend from said wrist-pins 41 through the packing-boxes 43 and are connected to any suitable governing means, as the governors 44, (see Fig. 1,) secured on the supporting-arms 45, formed integral on each end of the main cylinder 1 and by which the said cut-off valves are automatically operated. The governors or regulators 44 may be driven by a suitable belt 44$^b$ on a pulley secured on the main shaft 8.

A steam supplying or distributing chamber 46 is situated beneath the cylinder 1, on the steam-admission side thereof and intermediate between the steam-chests 23 and 24 thereof, and said steam-chamber is formed integral with said cylinder 1 and is provided with the steam branch ways or ports 47, which direct the steam to the valveways 48, formed in the reversing-valves 49 and 50. The reversing-valves 49 and 50 are cylindrical and are accurately fitted in their ways or seats 51 to form steam-tight joints, and said ways are situated one on each side of said steam-distributing chamber 46 intermediate between the latter and the steam-chests 23 and 24. The valves 49 and 50 are set or placed in position relatively to each other, and thus connected that when the valve 49 is moved into the position shown in Fig. 5—that is, to supply steam to the steam-chest 23 through the ports $p$ on the one side—the valve 50 on the opposite side is moved simultaneously into the position shown in Fig. 5—that is, in position to close the port $p$ to cut off the steam from the steam-chest 24, and vice versa. The steam reversing-valves 49 and 50 are provided with the valve-stems 52, which latter are prolonged to project through their packing-boxes 53, (see Fig. 3,) and on the projecting ends of said stems 52 are secured the levers 54, which latter extend upwardly from said stems and are connected at their forked or bifurcated ends to be operated simultaneously by the connecting-rod 55.

A reverse-shaft 56 is journaled in the bearings 57, formed integral on the main cylinder 1, and on the prolonged end of said shaft, exterior of the bearings thereof, is keyed or otherwise secured the reversing-lever 58, the lower or depending arm 59 of which is connected to the connecting-rod 55 by the connecting-rod 60.

The exhaust-chamber 61 is situated beneath the cylinder 1, on the side thereof opposite the steam-chamber, and is intermediate between the exhaust-valve ways 62, and said exhaust-chamber is separated from the steam-chamber 46 and steam-valve ways 51 by the separating-walls 63, (see Fig. 3,) and the said exhaust-steam chamber 61 and exhaust-valve seats or ways 62 are all formed integral with the main cylinder 1. The exhaust-valves 64 and 65 are alike and are fitted to accurately turn in their ways or seats 62, and said valves 64 and 65 are set or situated and connected relatively to each other that while the valve 64 is turned to open the port $ep$ to exhaust the valve 65 will be simultaneously moved to close its port $ep$ to prevent the steam admitted by the opposing steam-valve 25, situated in the steam-chest 23, from escaping, and vice versa. The valve-stems 67 are secured in the ends of said valves 64 and 65 and project through their packing-boxes 68, and on the ends of the said stems 67 are secured the exhaust-valve levers 69, the forked ends of which are connected to be operated simultaneously by the connecting-rod 70, and a connecting-rod 71 connects the latter rod with the end of the lever-arm 72, which latter is secured on the projecting end of the reversing-shaft 56—that is, that end situated at the exhaust side of the cylinder 1—and thus by moving the reversing-lever 58 solely the steam reversing-valves 49 and 50 and the exhaust-valves 64 and 65 are moved into their relative positions simultaneously to reverse or change the direction of motion from a right to a left hand direction when so required, or vice versa.

Suitable starting-valves 73 are provided for the purpose of priming or supplying live steam from the steam-chests 23 and 24 to the steam-chamber 16 of the main cylinder 1 on the operating side of either the wings 17$^a$ to start the engine when the rotary piston 13 thereof has stopped at a dead-point, as in the position shown in Figs. 5 and 6.

The operation of the engine is as follows: Steam is admitted into the steam-chamber 46 by the steam-supply pipe 74 and the steam-valves 49 and 50 are moved into the positions shown in Fig. 5 by the reverse-lever 56—that is, the valve 49 is opened to admit steam to the steam-chest 23 and the valve 50 is closed to prevent steam being admitted into the steam-chest 24. The steam flows through the peripheral openings of the cut-off valve or automatically-operated expansion-valve 26 into the distributing-valve 25 through one of the ports 27 thereof—that is, that one registering with the steam-port 26$^p$ of the automatic valve 26, through the steam-port $sp$ into the steam-chamber 16 against the piston-wing 17$^a$ to rotate the piston 13 in the direction indicated by the arrow $a$. (See Figs. 5 and 6.) The first piston-wing 17$^a$ opposite the port $sp$ when it has passed the exhaust-port $ep$ (see Fig. 6) permits the steam confined in the steam-chamber 16 between the adjacent piston-wings 17$^a$ to be exhausted through said port $ep$ and through the exhaustway of the exhaust-valve 64 into the exhaust-chamber 61, from whence it escapes through the exhaust-pipe 75 into the atmosphere, and thus the wings 17$^a$ are successively acted upon by the steam to rotate the driving-shaft 8 continuously to transmit power. When it is desired to reverse the direction of rotation of the piston 13, the steam-valve 49 is closed and the steam-valve 50 is opened to admit steam to the opposite steam-chest 24 and the exhaust-valve 65 is opened to permit the steam to be exhausted through the port $ep$ and $e$ and into the chamber 61, as before. The driving-gear 12 meshes with the valve-driving gears 36 to continuously rotate both the distributing-valves 25, and the port-openings 27 thereof are of a width and number to permit the steam to be admitted three times during each revolution of the piston 13 into the chamber 16, and the widths of said port-openings 27 are proportioned so that steam admitted into the steam space or chamber 16 while the piston-wing 17ᵃ has just passed the steam-port sp will be cut off at some portion of the travel of said wing 17ᵃ between said steam-port sp and the exhaust-port ep to use the steam expansively. The expansion-valves 26 are controlled solely by their centrifugal governors 44, which operate said valves respectively through the stems 42 to reduce the port-openings when the speed tends to exceed the normal, and said governors 44 operate to open said steam-ports when the speed tends to fall below the normal, and thus the steam-supply to the engine is automatically controlled to regulate the speed of the engine.

Any suitable fly-wheel or drum 76 is keyed on the projecting end of the driving-shaft 8, from which power may be taken by a suitable driving-belt.

Having thus fully described this my invention, what I claim as new and useful, and desire to cover by Letters Patent of the United States therefor, is—

In a reversible rotary engine, the combination with a cylinder having opposing steam inlet and exhaust ports, the opposing inlet-ports situated at one end of said cylinder and the exhaust-ports situated on the opposite end of said cylinder and in alinement with their adjacent steam-ports, continuously-rotating steam-distributing valves contiguous to each of said opposing steam-inlet ports, a steam-supplying chamber situated between said steam-distributing valves and a reversing-valve situated between said steam-chamber and each of said distributing-valves, exhaust-valves situated contiguous to said exhaust-ports, and means whereby said steam-reversing valves and said exhaust-valves are all moved simultaneously into their respective positions to cause the engine to rotate in either a right or a left hand direction of rotation.

In testimony whereof I have hereunto set my hand in the presence of two subscribing witnesses.

JAMES A. PORTER.

Witnesses:
   THOMPSON R. BELL,
   W. L. BUSHONG.